(12) United States Patent
Klein

(10) Patent No.: US 11,631,149 B2
(45) Date of Patent: Apr. 18, 2023

(54) COLLECTING AND TRANSMITTING UTILITY METER DATA

(71) Applicant: RACHIO, INC., Denver, CO (US)

(72) Inventor: Christopher M. Klein, Denver, CO (US)

(73) Assignee: RACHIO, INC., Denver, CO (US)

( * ) Notice: Subject to any disclaimer, the term of this patent is extended or adjusted under 35 U.S.C. 154(b) by 0 days.

(21) Appl. No.: 17/405,422

(22) Filed: Aug. 18, 2021

(65) Prior Publication Data

US 2022/0012823 A1 Jan. 13, 2022

Related U.S. Application Data

(63) Continuation of application No. 17/236,689, filed on Apr. 21, 2021.

(60) Provisional application No. 63/013,688, filed on Apr. 22, 2020.

(51) Int. Cl.
| | |
|---|---|
| *G01D 4/00* | (2006.01) |
| *G06Q 50/06* | (2012.01) |
| *G01F 15/06* | (2022.01) |
| *G01F 1/34* | (2006.01) |
| *E03B 7/07* | (2006.01) |

(52) U.S. Cl.
CPC .............. *G06Q 50/06* (2013.01); *E03B 7/071* (2013.01); *G01D 4/004* (2013.01); *G01F 1/34* (2013.01); *G01F 15/06* (2013.01); *H04Q 2209/60* (2013.01)

(58) Field of Classification Search
None
See application file for complete search history.

(56) References Cited

U.S. PATENT DOCUMENTS

| | | | |
|---|---|---|---|
| 7,930,069 B2 | 4/2011 | Savelle, Jr. et al. | |
| 10,506,307 B2 | 12/2019 | Adler et al. | |
| 10,750,253 B2 | 8/2020 | Adler et al. | |
| 11,082,294 B2* | 8/2021 | Magley | H04L 12/189 |
| 2011/0190947 A1* | 8/2011 | Savelle, Jr. | G05D 11/02 700/284 |
| 2015/0095090 A1* | 4/2015 | Altieri | G06Q 10/06313 705/7.23 |
| 2017/0105369 A1* | 4/2017 | Shamley | G01D 4/004 |
| 2017/0111713 A1 | 4/2017 | Adler et al. | |
| 2017/0184417 A1* | 6/2017 | Pedreiro | G01D 4/002 |

(Continued)

FOREIGN PATENT DOCUMENTS

WO 2020154384 A1 7/2020

*Primary Examiner* — Curtis A Kuntz
*Assistant Examiner* — Jerold B Murphy
(74) *Attorney, Agent, or Firm* — Dorsey & Whitney LLP

(57) ABSTRACT

Apparatuses, systems, and methods for collecting utility meter data are described. An example system may include a flow controller and a server. The flow controller is configured to communicate with a water meter for a property and connected to at least one water outlet of a plurality of water outlets. The server is coupled to one or more infrastructure databases and the flow controller. The server includes a non-transitory computer readable media and is configured to execute instructions stored on the non-transitory computer readable media. The instructions include receiving water usage data from the flow controller and transmitting the water usage data from the water meter for the property to a water utility company.

19 Claims, 5 Drawing Sheets

(56) References Cited

U.S. PATENT DOCUMENTS

| | | |
|---|---|---|
| 2018/0279022 A1 | 9/2018 | Adler et al. |
| 2019/0058630 A1* | 2/2019 | Magley ............... H04L 12/1868 |
| 2020/0084521 A1 | 3/2020 | Adler et al. |
| 2020/0267915 A1* | 8/2020 | Ferras .................. A01G 25/167 |

* cited by examiner

COLLECTING AND TRANSMITTING UTILITY METER DATA

CROSS-REFERENCE TO RELATED APPLICATIONS

This application is a continuation of U.S. patent application Ser. No. 17/236,689, filed Apr. 21, 2021, entitled "Collecting and Transmitting Utility Meter Data," which claims the benefit of priority of U.S. Provisional Patent Application No. 63/013,688, filed Apr. 22, 2020, and entitled "Systems and Methods for Collecting Utility Meter Data," all of which are hereby incorporated by reference herein in their entirety.

FIELD

The present disclosure relates generally to collecting utility meter data using a controller, such as a flow controller.

BACKGROUND

Utility meters, including water, gas, and electric meters, are regularly used for residential and commercial properties to meter the amount of each respective utility used at the property. Utility companies typically require a meter-reading device to be within a certain distance of the meter to be read and stored for billing and other purposes, thus requiring workers from the utility company to visit meters for the utility company. This is inefficient and requires multiple workers to travel frequently and around large areas.

SUMMARY

In one embodiment, a method of collecting utility meter data is described. The method includes detecting by a first water meter for a first property a first water usage data for the first property; receiving by a flow controller for a second property the first water usage data for the first property; and transmitting by the flow controller the first water usage data to a water utility company.

In another embodiment, a system is described that includes a first water meter for a first property. The first water meter is configured to detect a first water usage data for the first property. The system includes a flow controller for a second property configured to communicate with the first water meter and receive the first water usage data. The flow controller is connected to at least one water outlet of a plurality of water outlets. The system also includes a server coupled to an infrastructure database and the flow controller. The server includes a non-transitory computer readable media and is configured to execute instructions stored on the non-transitory computer readable media. The instructions include: receiving from the flow controller the first water usage data for the first property detected by the first water meter; and transmitting the first water usage data to a water utility company.

In another embodiment, a method of collecting utility meter data is described. The method includes detecting by a first water meter a first water usage data for a first property and receiving by a flow controller the first water usage data for the first property. The method also includes transmitting by the flow controller the first water usage data to a water utility company and determining an invoice amount for the first property based on the first water usage data. The method includes transmitting an invoice to at least one of the water utility company and a user device of a first customer associated with the first property.

SPECIFICATION

In some embodiments herein, a system for collecting utility meter data is disclosed. The system includes a controller, such as a sprinkler controller, that controls flow to one or more flow devices or outlets in a property, as well as provides dynamic monitoring of flow usage to enhance the flow patterns for a plurality of devices. In some examples, the controller tracks usage of a utility such as water, gas, or electricity associated with a property separately from a utility meter for the property that also tracks usage of the utility. The controller also communicates with one or more utility meters, such as those tracking utility usage for the property of the controller and/or other utility meters within a predetermined geographic area, such as a neighborhood, block, or other boundaries. In some examples, a utility meter for a first property tracks utility usage for the first property and communicates the utility usage data to the controller, where the controller is associated with a second property different than the first property. For example, the controller may communicate with one or more of a water meters tracking water consumption of the property where the controller is located or otherwise controls watering, a gas or electric meter on the same property as the controller, a water meter on a neighboring property, and/or a gas or electric meter on a neighboring property. The controller may collect utility usage data from the utility meters and transmit the utility usage data to a server in the system. The utility usage data can be used to detect leaks on a property, budget a utility, bill a customer for the utility, as well as combinations of these examples.

Figure 1:
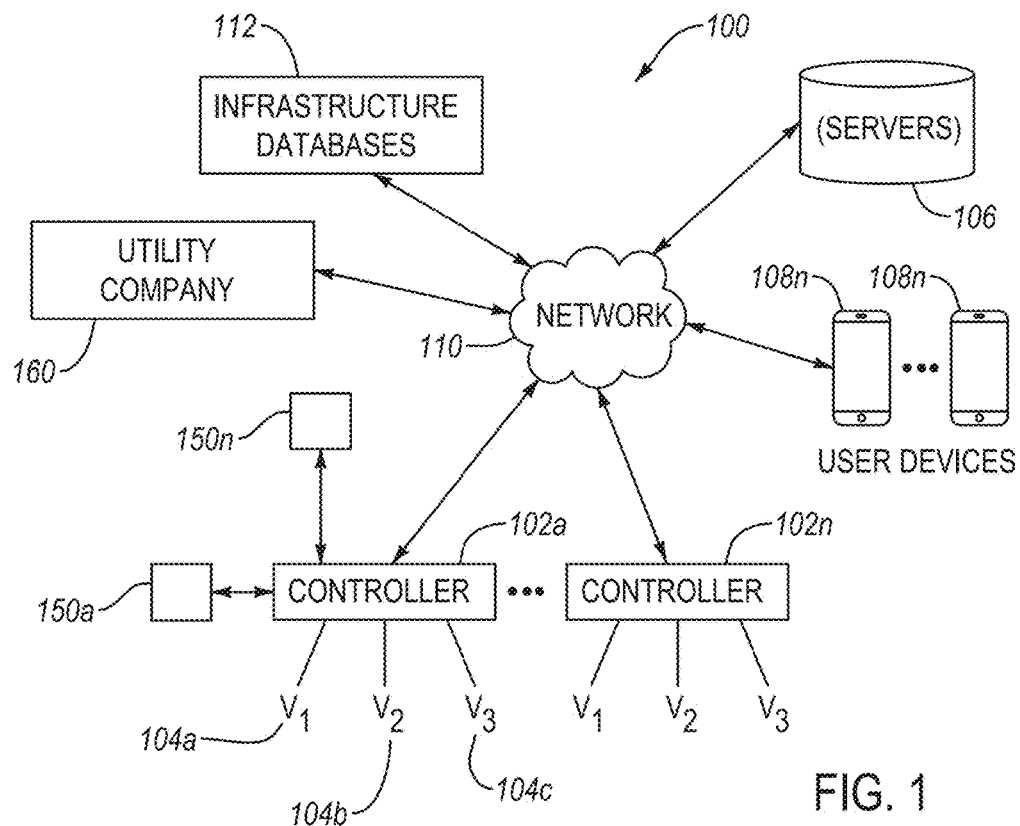
FIG. 1 is a block diagram of a system for collecting utility meter data.

Turning now to the figures, the system of the present disclosure will be discussed in more detail. FIG. 1 is a block diagram illustrating an example of a system 100 for collecting and utilizing utility usage data from a utility meter. The system 100 includes multiple controllers 102a, 102n that may include flow controllers connected to and configured to control a plurality of water outlets, such as a sprinkler valves, 104a, 104b, and 104c. The controller 102a may be associated with a property, e.g., the controller is connected to and controls a plurality of water outlets of the property with which the controller is associated. In other words, a controller 102a may be considered to be associated with a property where the controller sets and activates watering resources, such as sprinklers, for the property. The controller 102 may be in communication with utility meters for adjacent or other non-associated properties, such as properties within a predetermined geographic area (e.g., properties within about one-quarter mile to about one mile, or within range of a wireless communication protocol, such as, but not limited to, Bluetooth, Wi-Fi-Wi-Max, ZigBee, or the like.), on the same block as the associated property, adjacent to the associated property, or the like, and while the controller may receive utility information for these properties, it may not be connected to and does not control water outlets on these non-associated properties. In some embodiments, the controller 104a, 104n may be owned by a party other than the utility company 160, such as a property owner, tenant, landlord, service provider, or the like.

The system 100 also includes one or more servers 106, user devices 108a, 108n, and one or more infrastructure databases 112. The various components may be in communication directly or indirectly with one another, such as through a network 110. In this manner, the components can transmit and receive data from other components in the system. In many instances, the server 106 may act as a go between for some of the components in the system 100.

The network 110 may be substantially any type or combination of types communication system for transmitting data either through wired or wireless mechanism (e.g., Wi-Fi, Ethernet, Bluetooth, Wi-Max, ZigBee, cellular data, or the like). In some embodiments, certain components in the system 100 may communicate via a first mode (e.g., Bluetooth) and others may communicate via a second mode (e.g., Wi-Fi). Additionally, certain components may have multiple transmission mechanisms and be configured to communicate data in two or more manners. The configuration of the network 110 and communication mechanisms for the components may be varied as desired and based on the needs of a particular configuration or property.

The system 100 also includes utility meters 150a, 150n. The utility meter 150a may be associated with the controller 102a. That is, the utility meter 150a and the controller 102a may both be associated with the same property, e.g., the utility meter 150a detects utility consumption by the property and the controller 102a controls consumption of a utility at the same property, such as outdoor watering for the property. In some aspects, the controller 102a controls the same utility for the property for which the utility meter 150a detects consumption, e.g. water. Association of the utility meter 150a and the controller 102a at the same property also may include having a common owner or occupant. For example, the controller 102a may control consumption of water on the property, and a bill for the utility detected by the utility meter 150a is delivered to the owner of the property or an individual who resides or does business at the property. Association of the utility meter 150a and the controller 102a at the same property also may include both the utility meter 150a and the controller 102a being located on the same property address or on the same legally recorded or defined plot of land.

In other examples, the utility meter 150a and the controller 102a may be associated with a leasehold, a leaseholder, or other occupant of the land. For example, a plot of land may be divided into one or more portions associated with one or more leaseholders. A leaseholder may receive one or more utilities at the leased portion of land. The delivery of the utility to the leased portion may be measured by a utility meter 150a, 150n. A controller 102a, 102n may also be associated with the leased portion. The controller 102a, 102n may control consumption of the utility. The meter 150a, 150n and/or the controller 102a, 102n may be located on the leased portion or may be located on another portion of the plot not leased by the leaseholder and yet may still be associated with, measure, or control consumption and/or delivery of the utility to the leased portion. In other examples, the controller 102a may be associated with one or more publically available data sources such as voter registration, motor vehicle registration, property tax records, or the like. For example, the controller 102 may access via the network voter registration databases and compare names to addresses to associate a particular property with a utility meter and/or user account at a utility.

The utility meter(s) 150n may not be associated with corresponding controller(s) 102a, 102n and, as such, one or more of the utility meter(s) 150n may be associated with a property that does not include one of the corresponding controller(s) 102a, 102n. For example, if the controller 102a is not associated with one or more of the utility meter(s) 150n, the controller 102a may control consumption of a utility on a first property and one or more of the utility meters 150n detect utility consumption on a second property that is different than the first property. In another example, the controller 102a is not associated with the property of the utility meter(s) 150n because the controller 102a controls utility consumption on a first property and the utility meter(s) detects utility consumption on a second property having a different owner or occupant than the first property. In another example, the controller 102a is not associated with the property of the utility meter(s) 150n because the controller 102a is located on a first property having a first address or legally recorded plot of land the utility meter(s) are located on a second property having a second address or legally recorded plot of land different than the first property.

In another example of the controller 102a not being associated with the utility meter(s) 150n, the controller 102a may control consumption of a first utility on a property, with the first utility being billed to a first person or entity. The utility meters 150n may detect consumption of a different utility on the same property, but the different utility may be billed to one or more different people or entities. For example, the first property may include an apartment complex for which the controller 102a controls water and the water is billed to the owner of the complex. Utility meters 150n at the apartment complex may detect electricity consumption for the tenants, and these tenants may be billed individually for their respective electricity consumption. Accordingly, the controller 102a may not be associated with occupants of the units for which utility meters 150n detect utility consumption when both the controller 102a and the utility meters 150n are on the same property.

The controller 102a may be in communication directly or indirectly with the utility meter 150a. The controller 102a also may be in communication directly or indirectly with utility meter(s) 150n not associated with the property that includes the controller 102a and the utility meter 150a. The controller 102a may communicate with the utility meters 150a, 150n via radio frequency (RF). For example, utility meters 150a, 150n may include an RF transmitter/receiver for automatic meter reading (AMR). The controller 102a may include an RF transmitter/receiver that wirelessly communicates with the RF transmitters/receivers on the utility meters 150a, 150n over any of a number of different radio frequencies. In some embodiments, the controller 102a may communicate with the utility meters 150a, 150n through other types or combination of types of communication systems for transmitting data either through wired or wireless mechanism (e.g., Wi-Fi, Ethernet, Bluetooth, Wi-Max, ZigBee, direct sequence spread spectrum, frequency hopping spread spectrum, power line communication, cellular data, or the like). In some embodiments, certain components in the controller 102a and the utility meters 150a, 150n may communicate via a first mode (e.g., Bluetooth) and others may communicate via a second mode (e.g., Wi-Fi). Additionally, certain components may have multiple transmission mechanisms and be configured to communicate data in two or more manners.

The utility meters 150a, 150n may be any type of utility meter, such as water meters, gas meters, electric meters, and so forth that detect consumption of the respective resource or utility. The utility meters 150a, 150n may detect consumption rate of a resource or utility (e.g., water flow rate, gas flow rate, or electrical power). In the case of fluidic utilities like water and gas, the flow rate may be either a volumetric flow rate (e.g., CCF per day) or a mass flow rate (e.g., kg per hour). In the case of a gas and/or electric meter, the flow rate may be measured in energy delivered per unit of time (e.g., BTU per hour or Joules per second, aka, Watts). In some embodiments, the utility meters 150a, 150n may detect an accumulated amount of the resource or utility consumed over time (e.g., CCF or kWh). In some embodiments, the utility meters 150a, 150n may detect the time of use of a resource, such as detecting electricity usage at peak consumption times when rates may be higher than normal. The utility meters 150a, 150n may record the detected consumption data in an internal memory component 508. The utility meters 150a, 150n may transmit the detected consumption data as further described herein.

In some embodiments, the utility meter 150a includes a water meter for a first property or unit, and the utility meters 150n include other utility meters for the same first property or unit, such as a gas meter or an electric meter for the first property or unit. In some embodiments, the utility meter 150a includes a water meter for a first property or unit, and the utility meters 150n include one or more water meters for one or more nearby or other properties or unit, such as a second property in the neighborhood of the first property. The utility meter(s) 150n also may include utility meter(s) within a predetermined radius or range of the controller 102a, such as utility meter(s) within about 100 yards, about one-quarter mile, about one-half mile, or about one mile, or otherwise having a data communication or transmission radius that reaches the controller (e.g., a utility that is in electrical communication with the controller). In some embodiments, the utility meter 150a includes a water meter for a first property, and the utility meters 150n include a gas and/or electric meter for the first property, a water meter for a second property, and a gas and/or electric meter for the second property within the predetermined radius or range of the controller 102a. In some embodiments, the utility meter 150a includes at least one of a water, gas, and/or electric meter for a first property, and the utility meter(s) 150n include at least one of a water, gas, and/or electric meter for a second property within the predetermined radius or range of the controller 102a, such as a second property in the neighborhood of the first property.

The controllers 102a, 102n may include any type of device that controls, tracks, and/or regulates flow to one or more flow devices or outlets 104a, 104b. In one embodiment, the controllers 102a, 102n are smart sprinkler controllers that control the operation of a plurality of sprinkler valves in one or more watering zones for a particular property or area (e.g., residential property). An example of a sprinkler controller that may be used with the system 100 can be found in U.S. Publication No. 2015/0319941 filed on May 6, 2014 and entitled "Sprinkler and Method for an Improved Sprinkler Control System," which is incorporated by reference herein in its entirety. The sprinkler valves may be electronically operated, such as one or more solenoid valves that open and close a flow path to a sprinkler head. While reference is made herein to controllers 102a, 102n such as flow controllers that control consumption of a utility on a property, other controllers 102a, 102n are also contemplated. For example, the controllers 102a, 102n also may include other electronic devices in a home or on a property configured to communicate with the utility meters 150a, 150n.

In other embodiments, the controllers 102a, 102n control various types of water outlets, and may be positioned on a property or home. For example, the controllers 102a, 102n may be configured to turn on or turn off flow for a particular property such as a valve controller connected to a main water supply line. In these embodiments, the outlets 104a, 104b, 104c may be different from one another, e.g., sprinkler valve, showerhead, toilet, washing machine, dishwasher, or the like. In this manner, it should be understood that the discussion of any particular flow outlet or controller is meant as illustrative only.

In yet other examples, the controllers may be devices that are in electrical communication with a water utility and in communication with a property network, such as an in-home Wi-Fi network, e.g., internet of things (IoT) devices, home assistant devices, computers, or the like. In these instances, the controllers may be used to control select devices, such as lighting elements, HVAC elements, or the like, and be able to communicate with user devices, and a utility meter.

In yet other examples, the controller 102a, 102n may communicate with one or more utility meters 150a, 150n and receive utility usage data. The utility usage data may be any information that a utility meter 150a, 150n determines, generates, tracks, or stores. The utility usage data may be any data that the utility company 160 receives from a utility meter 150a, 150n. For example, the utility information may include utility consumption amounts, rates, prices, or times of use. The controller 102a, 102n may transmit utility usage data received from the one or more utility meters 150a, 150n to the respective utility companies 160 associated with the one or more utility meters 150a, 150n. For example, the controller 102a, 102n may transmit utility usage data to the respective utility companies 160 via the network 110. The controller 102a, 102n may be an IoT device. An advantage of such communications may be that the utility company 160 does not need to physically visit a property to determine the utility usage data thus saving labor, time, and expense. Additionally, or alternately, such communications may enable more timely billing and more timely collection of payment compared to current methods.

The server 106 is a computing device that processes and executes information. The server 106 may include its own processing elements, memory components, and the like, and/or may be in communication with one or more external components (e.g., separate memory storage) (an example of computing elements that may be included in the server 106 is disclosed below with respect to FIG. 6). The server 106 may also include one or more server computers interconnected together via the network 110 or separate communication protocol. The server 106 may host and execute a number of the processes executed by the system 100 and/or the controllers 102a, 102n. In some embodiments, the controllers 102a, 102 may communicate with specialized servers 106 that communicate with a specialized system server 106 or each may communicate with the same server 106 or groups of servers.

The user devices 108a, 108n are various types of computing devices, e.g., smart phones, tablet computers, desktop computers, laptop computers, set top boxes, gaming devices, wearable devices, or the like. The user devices 108a, 108n provide output to and receive input from a user. For example, the server 106 may transmit one or more alerts to the user devices 108a, 108n to indicate information regarding the controller 102a, 102n, the water outlets 104a, 104b, 104c, and/or the property being watered. The type and number of user devices 108a, 108n may vary as desired and may include tiered or otherwise segmented types of devices (e.g., primary user device, secondary user device, guest device, or the like).

The one or more infrastructure or utility databases 112 store or include access to data and/or sensors from various devices or information hubs. The infrastructure databases 112 may include computing devices, such as servers, user devices, or the like, that include data on environmental factors (e.g., weather tracking), utility information (e.g., average water usage for a neighborhood or house, average water pricing rates, watering restrictions, etc.), water reservoir or water source information, smart home devices (e.g., smart thermostat, alarm system), sensor data, or the like. The infrastructure databases 112 may be substantially any device or group of devices that provide environmental or external data that is relevant or correlates to the system 100. In some embodiments, the infrastructure databases 112 include data corresponding to a water utility information, such as reservoir level or percentage, delivery capacity (e.g., pipe diameter), historical use, rates, predicted use, and future developments or construction.

Figure 2:
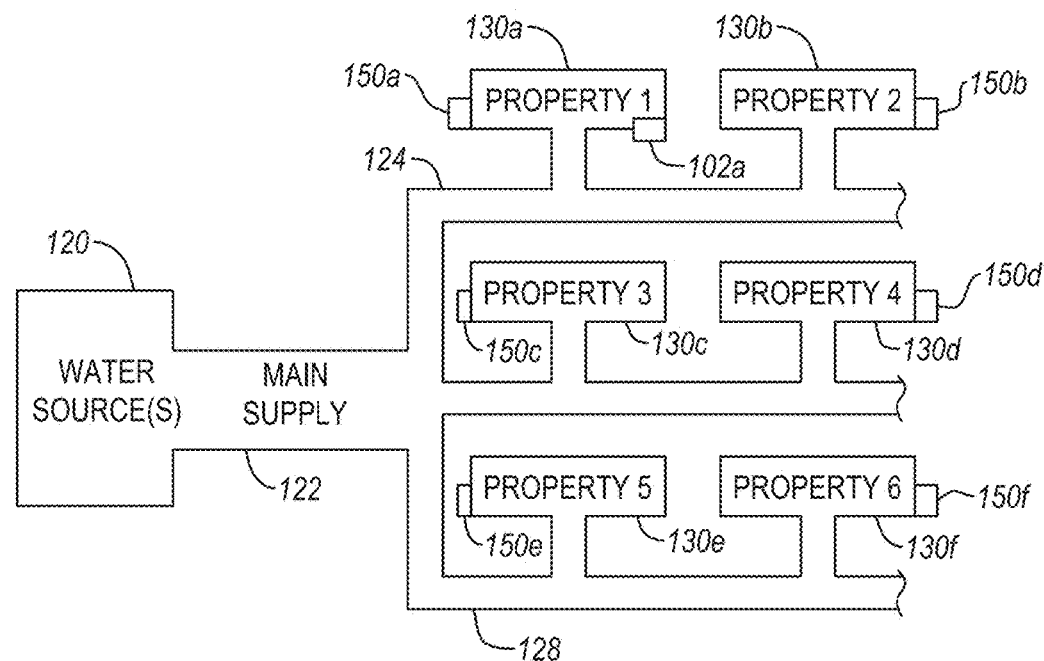
FIG. 2 is a simplified flow diagram illustrating implementation of the system of FIG. 1 on one or more properties.

FIG. 2 is a simplified flow diagram illustrating an infrastructure utilizing the system 100. With reference to FIG. 2, the utility may include one or more water sources 120 that supply water via a main supply 122 to multiple properties 130a, 130b, 130c, 130d, 130e, 130f directly or through one or more branches 124, 126, 128. The water source 120 may be a reservoir, water tank, lake, pond, river, stream, well, cistern, etc. that is used (solely or in part) to deliver water to the properties 130a-130f. The utility also may at least one of a gas utility and/or an electric utility that supplies gas and/or electricity or other utility resource to various properties 130a-130f. As can be understood, the delivery types and mechanism may be varied depending on the type of utility being delivered, e.g., pipes for water, wires for electricity, and the like. The properties 130a-130f include a utility meter 150a-150f, which may be either connected to or on the property or may be otherwise be configured to track usage of the utility resource by the property or units on the property, e.g., a water meter may not be located on a particular property but be configured to detect water usage for the property. The utility meters 150a-150f may include any of the utility meters described above. The infrastructure database 112 may include data corresponding to the level of the water source 120, such as the fill height, used percentage, or the like, that is used to correlate water usage as compared to water replenishment, as well as rate, usage, and account information corresponding to the properties serviced by the utility.

Although shown in FIG. 2 as water sources 120 that supply water via main supply 122 to the properties 130a-130f directly or through the branches 124, 126, 128, other utilities may include a similar configuration for providing utilities to the properties 130a-130f. For example, in addition to water, other utilities such as gas and electricity may be provided to the properties 130a-130f. The utility company 160 may install branches that provide the utility to the properties 130a-130f, such as water pipes, electrical lines, or gas lines that transports a utility to individual properties 130a-130f for consumption at the individual properties. The utility meters 150a-150f may be connected to the branches and are configured to meter or detect the amount of utility consumed at the properties 130a-130f. The utility company 160 also may bill the individual owners or occupants of the properties 130a-130f for the amount of the utility consumed at the properties 130a-130f, as measured by the utility meters 150a-150f. For example, many utilities will send monthly invoices to consumers, such as property owners, for the resources consumed by the particular property during the invoiced time frame. Often, these invoices are sent after the utility has conducted a reading of the utility meter, matched the account information (e.g., billing information) with the determined consumption data read from the meter, and then mails out or otherwise transmits the invoice to the consumer.

With reference to FIGS. 1 and 2, at least one of the properties 130a-130f, or select groups of the properties 130a-130f (e.g., two or more properties), include a controller 102a. In the flow diagram of FIG. 2, the property 130a includes the controller 102a. In some embodiments, one or more additional properties 130b-130f may include a controller 102n. The controller 102a detects water flow usage by the one or more properties 130a-130f fluidly connected to the controller 102a as discussed above. In some embodiments, properties 130a-130f (or a portion of the properties) includes a controller 102a such that the water usage of the main supply 122 by the specific property can be detected and tracked, or at least that data from a meter positioned for a property can be read or transmitted to a controller.

In some embodiments, the system 100 may be used to control and track the water or other utility usage of multiple properties, e.g., a plurality of residential homes, an apartment or condominium complex, commercial complex (e.g., business park), or the like. In these embodiments, the system may communicate with multiple controllers 102a, 102n for the various properties. The properties 130a-130f may include indoor flow sources and outdoor flow sources 104a-104c, or in some instances, such as an apartment building some units will include only indoor usage. For example, in some areas, indoor flow sources may provide potable or drinkable water, and outdoor flow sources may include secondary or reclaimed water that may not be suitable for drinking or human consumption. These flow sources may be connected to one or more controllers 102a, 102n

In some embodiments, the controllers 102a, 102n may be configured to distinguish indoor water usage from outdoor water usage for each property 130a-130f, but in other examples, the controllers 102a, 102n may be configured to detect overall usage for the property 130a-130f (regardless of the type) or may be configured to detect either indoor/outdoor or a specific type of use (e.g., sprinkler/irrigation use). For example, the controllers 102a may estimate outdoor water usage based on irrigation duration and known irrigation characteristics (e.g., sprinkler valve types and flow rate information) for the property 130a during a month, which may be controlled by the controller 102. For example, the controllers 102 may estimate outdoor water usage based on watering times and estimated volume delivered to the area per minute or other interval. Indoor water usage for the month can be determined by subtracting estimated or measured outdoor water usage from the total water usage for the month. Other examples of determining water usage are described in U.S. Patent Publication 2016/0335875 filed on May 12, 2016 and entitled "Flow Characteristic Detection and Automatic Flow Shutoff," which is incorporated herein by reference in its entirety.

In another example, the controllers 102a, 102n may distinguish indoor water usage from outdoor water usage based on the water line providing the water to the properties 130a-130f, e.g. the controllers 102a, 102n may detect indoor water usage based on water line flow metering or sensing, e.g., may include a flow sensor on the various water lines (indoor and outdoor) to measure flow therethrough. For example either or both the water meter or the controller may detect water usage via an appropriate flow sensor such as a paddle wheel sensor, turbine sensor, positive displacement sensor, orifice sensor, venture sensor, pitot tube, or the like. The type of water usage detected may be by the controllers 102a, 102n directly or indirectly.

In operation, the controller 102a for the property 130a communicates with the utility meter 150a for the property 130a to receive utility usage data from the utility meter 150a. The utility usage data received by the controller 102a from the utility meter 150a can include, for example, one or more of water usage data from a water meter, gas usage data from a gas meter, and/or electric usage data from an electric meter. The usage data may include consumption information, as well as consumption type (e.g., indoor vs. outdoor usage), account information (e.g., property ID, consumer ID, account ID, or the like), time of use, on-site generation (e.g., electricity generated onsite by renewable resources like solar panels), peak and/or off-peak consumption. The usage data may associate a meter ID (e.g., a serial number or the like) with the property for which the meter detects utility usage. Water usage data may include specific volumes of water consumed or used on the property 130a per predetermined period of time, such as gallons per day, gallons per month or billing cycle, centum cubic feet (CCF) per day, CCF per month or billing cycle, and so forth. Gas usage data may include specific volumes of gas (such as natural gas) consumed or used on the property 130a per predetermined period of time, such as CCF per day, CCF per month or billing cycle, a heating value of the gas delivered (e.g., Lower or higher heating value), and so forth. Electric usage data may include specific watts of electricity consumed or used on the property 130a per predetermined period of time, such kilowatt-hours (kWh) per day, kWh per month, and so forth.

Communication between the controller 102a and the utility meter 150a can occur automatically at any of a number of different predetermined time periods or intervals, such as real-time intervals (intervals of less than about one minute, less than about 30 seconds, less than about 10 seconds, less than about 5 seconds, or less than about 1 second), hourly intervals, daily intervals, monthly intervals, and/or billing cycle intervals. Communication between the controller 102a and the utility meter 150a also can occur upon request from an authorized individual or entity. For example, the owner or occupant of the property 130a can request the controller 102a communicate with the utility meter 150a to determine instant utility consumption or utility consumption over one or more of the predetermined time periods or intervals described above. The owner or occupant of the property 130a may request the controller 102a communicate with the utility meter 150a via the user device 108a or at the controller 102a. In another example, the utility company 160 or other authorized person or entity (e.g., police, fire department, paramedics, controller 102a company, builders, etc.) can instruct the controller 102a communicate with the utility meter 150a to determine instant utility consumption or utility consumption over one or more of the predetermined time periods or intervals described above.

Similarly, the controller 102a for the property 130a can be configured to communicate with one or more of the utility meters 150b-150f for other properties 130b-130f to receive utility usage data from one or more of the utility meters 150b-150f. The utility usage data received by the controller 102a from one or more of the utility meters 150b-150f can include, for example, one or more of water usage data from a water meter, gas usage data from a gas meter, and/or electric usage data from an electric meter. Communication between the controller 102a and one or more of the utility meters 150b-150f can occur automatically at any of a number of different predetermined time periods or intervals, such as real-time intervals (intervals of less than about one minute, less than about 30 seconds, less than about 10 seconds, less than about 5 seconds, or less than about 1 second), hourly intervals, daily intervals, monthly intervals, and/or billing cycle intervals. In some embodiments, the owner or occupant of the property 130a is not authorized to request the controller 102a communicate with utility meters 150b-150f on properties 130b-130f.

In some embodiments, the utility usage data received by the controller 102a for the properties 130a-130f can include an amount of the utility consumed by the respective properties 130a-130f during a predetermined time period or interval. In some embodiments, the utility usage data received by the controller 102a for the properties 130a-130f can include a total amount of the utility used at the respective properties 130a-130f, and the controller 102a or the server 106 can compare the total amount of the utility used at the respective properties 130a-130f to a previous amount of the utility used at the respective properties 130a-130a to determine an amount of the utility used at the respective properties 130a-130f during the predetermined time period or interval. For example, the utility meter 150a may not reset to zero each billing cycle or predetermined time period, and instead meter a cumulative or all-time amount of the utility used at the property 130a. The utility usage data for the property 130a retrieved by the controller 102a from the utility meter 150a, then, may include the cumulative or all-time amount of the utility used at the property 130a. The controller 102a or the server 106 may be configured to compare a most recent cumulative or all-time amount of the utility used at the property 130a to one or more previous cumulative or all-time amounts of the utility used at the property 130a to determine an amount of the utility used at the property 130a during a predetermined time period or interval.

In a specific example of the utility meter 150a including a water meter 150a, the controller 102a may communicate with a water meter 150a on the property 130a at the end of a first billing cycle, the communication from the water meter 150a indicating that the water meter 150a has detected that the property 130a has consumed 10,000 CCFs of water since the water meter 150a began detecting water consumption on the property 130a. The controller 102 may then communicate with the water meter 150a on the property 130a at the end of a second billing cycle, the communication from the water meter 150a indicating that the water meter 150a has detected that the property has consumed 10,050 CCFs of water since the water meter began detecting water consumption on the property 130a. The amount of water used at the property during the second billing cycle, then, is 50 CCFs. In another example, the water meter 150a resets to 0 each month. In the provided scenario, then, the controller 102 may communicate with the water meter 150a on the property 130a at the end of the billing cycle, and the communication from the water meter 150a indicates that the water meter 150a has detected that the property consumed 50 CCFs during the second billing cycle.

The utility usage data received by the controller 102a also may include identification information such as user account information, global positioning system coordinates for the utility meters 150a-150f, addresses for the properties 130a-130f of the meters 150a-150f, unique utility meter identification numbers, etc. The identification information included with the utility usage data may be used by one or more of the controller 102a, the server 106, or combinations thereof to correlate utility usage data with certain properties or users. The identification information in the utility usage data also may indicate, for billing and invoicing purposes, that the utility usage data received by the controller 102a on the property 130a is not itself associated with the property 130a.

The controller 102a may be configured to communicate the utility usage data to one or more of the server 106, the user devices 108a, 108n, or the utility company 160 through the network 110. In some embodiments, the server 106 is configured to execute instructions to request and/or receive the utility usage data from the controller 102a, the utility usage data having previously been received by the controller 102a from one or more of the utility meters 150a-150f. The server 106 also may be configured to execute instructions to transmit the utility usage data for properties 130a-130f received from the controller 102a to the utility company 160. The utility usage data transmitted to the utility company 160 by the server 106 may include the amount of the utility used at the respective properties 130a-130f during a predetermined time period or interval, or the cumulative or all-time amount of the utility used at the respective properties 130a-130f. In some embodiments, the server 106 is configured to execute instructions to determine the amount of the utility used at the respective properties 130a-130f since the server last transmitted the utility usage data to the utility company 160, such as the amount of the utility used at the respective properties in the most recent billing cycle.

In some embodiments, the server 106 also may be configured to execute instructions to determine an invoice amount for the properties 130a-130f for which the server 106 received utility usage data. For example, the server 106 may be configured to execute instructions to determine a water invoice amount for the property 130a by multiplying the local rate of water per CCF by the CCFs of water consumed on the property 130a based on the water usage data. The server 106 also may include any additional fees in the water invoice amount, such as service fees, taxes, penalties and surcharges, etc. The server 106 also may be configured to execute instructions to receive utility rates from the utility company 160 to determine the invoice amount for the properties 130a-130f for which the server 106 received utility usage data. In some examples, the invoice is determined by a server 106 not associated with a utility company 160. For example, the server 106 may be associated with a provider of the controller 102a, 102n, or another party. The invoice may be determined by calculating an amount of a utility delivered, e.g., as determined by a utility meter 150a, 150n. The amount of the utility delivered may be multiplied by a price per unit, (e.g., dollars per CCF, cents per kWh, cents per BTU, or the like. The price per unit may be adjusted based on the amount of the utility delivered. For example, the price per unit may be increased when the amount of the utility delivered exceeds a predetermined amount in a given time, a utility cap, or the like. The invoice may be further determined by adding surcharges, taxes, connection or disconnection fees, or the like.

The server 106 also may be configured to execute instructions to transmit an invoice for the invoice amount to at least one of the utility company 160 or the user devices 108a, 108n associated with the respective properties 130a-130f and/or utility meters 150a-150f. For example, in some embodiments, the server 106 is configured to execute instructions to transmit the invoice amount directly or at least usage information to the utility company 160, and the utility company 160 may then invoice the customer(s) associated with the respective utility meters 150a-150f and utility usage data. In some embodiments, the server 106 is configured to execute instructions to transmit an invoice for the invoice amount directly to the user devices 108a, 108n associated with the respective properties 130a-130f and/or utility meters 150a-150f for billing. When the server 106 transmits the invoice for the invoice amount directly to the user devices 108a, 108n, the server 106 also may be configured to execute instructions to transmit the invoice for the invoice amount to the utility company 160 for record keeping by the utility company 160. In some embodiments, the server 106 is configured to execute instructions to receive an invoice for one or more of the properties 130a-130f, and then transmit the invoice to the one or more user devices 108a, 108n associated with the one or more of the properties 130a-130f. The devices of the system 100 may interface with one another via an application program interface ("API") that translates data from one device of the system 100 to another device of the system 100. For example, the server 106 may transmit invoice, consumption, and/or payment data to the utility company 160 over the network 110 via an appropriate API. Similarly, a user may access invoice, consumption and/or payment data with a user device 108a, 108n from the server 196 or the utility company 160 via an appropriate API. An advantage of using an API may be the flexibility gained when interfacing devices from many different providers or utility companies 160 without the need to re-engineer the devices themselves for each utility company 160.

The server 106 also may be configured to execute instructions to receive instant utility usage data for a selected time period from the controller 102a. For example, as described above, the controller 102a may be configured to communicate with utility meters 150a-150f at any of a number of different predetermined time periods or intervals to receive utility usage data for the respective utility meters 150a-150f. The controller 102a may be configured to transmit utility usage data for a selected time period to the server 106, or the server 106 may be configured to determine utility usage data for a selected time period using the utility usage data for one or more of the different predetermined time periods or intervals as received from the controller 102a. The instant utility usage data for the selected time period may include one or more of the predetermined time periods or intervals described, such as the utility usage data for the past 5 minutes, the past 10 minutes, the past 30 minutes, the past hour, the past 12 hours, the past day, the past month, and so on. For example, the controller 102a may be configured to transmit to the server 106 the water usage data for a day at the property 130a, or the server 106 may be configured to determine the water usage data for a day at the property 130a using the water usage data transmitted to the server 106.

The server 106 also may be configured to execute instructions to determine a historical utility usage data for the one or more of the properties 130a-130f. The historical utility usage data may be determined using the utility data from the respective one or more properties 130a-130f over a predetermined period of time that is greater than a selected period of time. For example, the server 106 may be configured to execute instructions to determine a historical utility usage data by averaging the daily utility usage for the past month, year, or other time frame at the one or more respective properties 130a-130f. The server 106 also may be configured to execute instructions to determine a historical utility usage data using by averaging the daily utility usage for a particular month or season based on multiple years of utility usage. The server 106 also may be configured to execute instructions to determine a historical utility usage data by averaging utility usage in a predetermined geographic area, such as properties 130a-130f. In some embodiments, the server 106 also may be configured to execute instructions to determine a historical utility usage data by communicating with the infrastructure databases 112 described above.

The server 106 also may be configured to execute instructions to determine a likelihood of a utility leak at one or more of the properties 130a-130f by comparing the instant utility usage data for the selected period of time to the historical or average utility usage data. For example, the server 106 may be configured to execute instructions to determine a likelihood of a water leak at the property 130a by comparing the instant water usage data for the past day at the property 130a to historical usage data at the property 130a and/or the properties 130b-130f. The likelihood of the utility leak may, for example, be determined based on a threshold number of standard deviations from any of the averages described above.

In some embodiments, if the server 106 determines that a utility leak is likely to have occurred at one or more of the properties 130a-130f, the server 106 also may be configured to execute instructions to transmit a message or alert to at least one of the utility company 160 and/or the user device 108a, 108n associated with the one or more of the properties 130a-130f determined to have a utility leak. The message or alert may indicate the likelihood of the utility leak at the one or more of the properties 130a-130f, and also may include additional instructions for the customer.

In some embodiments, at least one of the controller 102a or the server 106 is configured to receive an encryption key from the utility company 160. For example, the encryption key may be sent by the utility company 160 via the network 110. In other examples, the encryption key may be sent from the utility company 160 via other methods such as mail, a delivery of a memory device containing the encryption key, or the like. The encryption key may be used by at least one of the controller 102a and/or the server 106 to decode the utility usage data received from one or more of the utility meters 150a-150f. For example, a processing element of the controller 102a and/or the server 106 may decode the utility usage data by executing instructions that cause the processing element to decrypt a cryptographic hash of the utility data using the encryption key. In some embodiments, the controller 102a receives the encryption key and is configured to use the encryption key to decode the utility usage data received from one or more of the utility meters 150a-150f before transmitting the utility usage data to the server 106. In some embodiments, the controller 102a transmits the utility usage data to the server 106 before the utility usage data is decoded, and the server 106 is configured to execute instructions to use the encryption key to decode the utility usage data. In one example, the encryption key may a public key of a public/private encryption key pair such as used in a public key or asymmetric encryption algorithm. For example, the utility company 160, server 106, and/or controller 102a may generate a public/private encryption key pair. The utility company 160, server 106, and/or controller 102a may transmit the public key to another device. The other device may use the public key to encrypt data and transmit the data back to the creator of the public key. The creator of the public key may then use the private key of the pair to decrypt the data. Such asymmetric encryption may have the advantage that the key used to decrypt encrypted information may not be transmitted and thus subject to being compromised.

The server 106 also may be configured to execute instructions to determine a budgeted amount of a utility usage during a budgeted time period for one or more of the properties 130a-130f. The budgeted time period, for example, may include a billing cycle, a day, a week, a month, or multiple months. The budgeted amount of the utility usage may be determined by the server 106 based on utility caps, maximums, or recommendations received from the infrastructure database 112 or the utility company 160. For example, the budgeted amount of water usage may be determined by the server based on water caps or maximums mandated or suggested by local government in the infrastructure database 112 or the water utility company. The budgeted amount of utility usage may include a budgeted amount of the utility before a price for the utility increases. For example, a utility company may provide a utility at a first rate until an amount of the utility is used during a billing cycle, after which the utility company may provide the utility at a second rate that is greater than the first rate. The budgeted amount of utility usage may be determined by the server based on a monetary budget entered by the customer associated with one of the properties 130a-130f. For example, a customer associated with the property 130a may enter a monetary budget of $100 for a billing cycle. The server 106, then, may determine the budgeted amount of water usage that corresponds to the monetary budget of $100 for the billing cycle of the customer associated with the property 130a. The budgeted amount of the utility usage may be determined by the server 106 based on an average amount of the utility used on the properties 130a-130f. For example, the controller 102a may be configured to collect water usage data from the properties 130a-130f, and the server 106 may be configured to determine a budgeted amount of water usage based on an average amount of the water used by the properties 130a-130f.

As noted above, the controller 102a may be configured to distinguish indoor water usage from outdoor water usage for each property 130a-130f or may be configured to detect either indoor/outdoor or a specific type of use (e.g., sprinkler/irrigation use). Accordingly, the server 106 also may be configured to execute instructions to determine a budgeted amount of indoor water usage and a budgeted amount of outdoor water usage during a budgeted time period for the properties 130a-130f. The budgeted amount of indoor water usage and the budgeted amount of outdoor water usage may be determined by the server 106 based on water usage caps, maximums, or suggestions received from the infrastructure database 112 or the utility company 160. For example, the budgeted amount of indoor water usage and the budgeted amount of outdoor water usage may be determined by the server based on indoor and outdoor water usage caps or maximums mandated or encouraged by local government in the infrastructure database 112 or the water utility company. The budgeted amount of indoor water usage and the budgeted amount of outdoor water usage may be determined by the server based on a monetary indoor and outdoor water budget entered by the customer associated with one of the properties 130a-130f. The budgeted amount of indoor water usage and the budgeted amount of outdoor water usage may be determined by the server 106 based on an average amount of indoor and outdoor water used on the properties 130a-130f.

The server 106 also may be configured to execute instructions to receive budgeted utility usage data for the budgeted time period from the controller 102a for one or more of the properties 130a-130f, the budgeted utility usage data having been received by the controller 102a from one or more of the utility meters 150a-150f. In many embodiments, the budgeted utility usage data is included in the utility usage data received by the controller 102a from one or more of the utility meters 150a-150f and transmitted from the controller 102a to the server 106. Once received by the server 106, the server 106 may be configured to execute instructions to identify the budgeted utility usage data for the one or more properties 130a-130f from the utility usage data from the one or more utility meters 150a-150f.

Because the controller 102a may be configured to distinguish indoor water usage from outdoor water usage for each property 130a-130f, the server 106 also may be configured to execute instructions to receive budgeted indoor water usage data and budgeted outdoor water usage data for the budgeted time period from the controller 102a for one or more of the properties 130a-130f, the budgeted indoor water usage data and the budgeted outdoor water usage data having been received by the controller 102a from one or more of the utility meters 150a-150f. In many embodiments, the budgeted indoor water usage data and the budgeted outdoor water usage data are included in the water usage data received by the controller 102a from one or more of the utility meters 150a-150f and transmitted from the controller 102a to the server 106. Once received by the server 106, the server 106 may be configured to execute instructions to identify the budgeted indoor water usage data and the budgeted outdoor water usage data for the one or more properties 130a-130f from the water usage data from the one or more utility meters 150a-150f.

The server 106 also may be configured to execute instructions to transmit a message or other notification to a user device 108a, 108n associated with a property of the properties 130a-130f when the budgeted utility usage data indicates that utility usage at the property during the budgeted time period meets or exceeds a predetermined percent of the budgeted amount of utility usage during the budgeted time period. The predetermined percent of the budgeted amount of utility usage may include any predetermined percent, such as 25%, 50%, 75%, 90%, 95%, and/or 100%. For example, if the server 106 determines that the water usage data for the property 130a indicates that water usage at the property 130a during a billing cycle exceeds a predetermined threshold, the server 106 may execute instructions to transmit a message to the user device 108a associated with the customer on the property 130a, the message indicating that the predetermined threshold of water usage for the billing cycle has been met or exceeded.

Because the controllers 102a may be configured to distinguish indoor water usage from outdoor water usage for each property 130a-130f, the server 106 also may be configured to execute instructions to transmit a message to a user device 108a, 108n associated with a property of the properties 130a-130f when the budgeted indoor water usage data or the budgeted outdoor water usage data indicates that indoor water usage or outdoor water usage at the property during the budgeted time period meets or exceeds a predetermined percent of the budgeted amount of indoor water usage or outdoor water usage during the budgeted time period.

Figure 3:
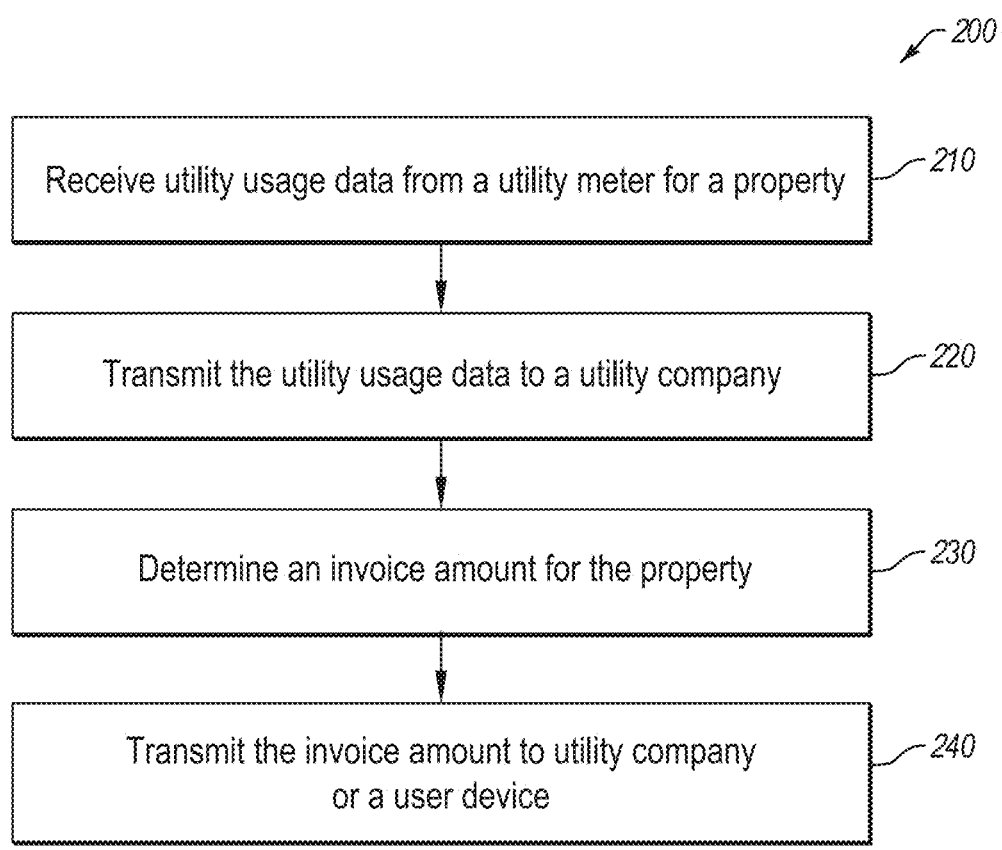
FIG. 3 is a flow chart illustrating a method of the system of FIG. 1 to collect utility meter data.

FIG. 3 is a flow chart illustrating a method 200 of the system 100 to collect utility meter data from one or more properties 130a-130f using the controller 102a and one or more utility meters 150a-150f. The method 200 may include operations 210, 220, 230, and 240 described in greater detail below. Operations 210, 220, 230, and 240 are for illustrative purposes. For example, operations 210, 220, 230, and 240 may be performed in different orders, split into multiple operations, modified, supplemented, or combined. In an embodiment, one or more of the operations 210, 220, 230, and 240 of the method 200 may be omitted from the method 200. In many embodiments, one or more of the controller 102a, the server 106, or a combination of the controller 102 and the server 106 may perform one or more (e.g., all) of the operations 210, 220, 230, and 240.

With reference to FIG. 3, the method 200 may begin with operation 210 and the controller 102a receives utility usage data from a utility meter 150a-150f for one or more properties 130a-130f. For example, operation 210 may include receiving by the controller 102a for the property 130a water usage data from a utility meter 150a (such as a water meter) for the property 130a. In some embodiments, the controller 102a receives utility usage data from one or more of the utility meters 150a-150f via RF communication between the controller 102a and the one or more of the utility meters 150a-150f. The utility usage data may be emitted or broadcast via RF continuously, periodically, or at other intervals by the utility meters 150a-150f. Additionally or alternatively, the controller 102a may transmit a request to the one or more utility meters 150a-150f for the utility usage data, and the one or more utility meters 150a-150f may transmit or broadcast the utility usage data in response to the request from the controller 102a. In some embodiments, these described communications between the controller 102a and the utility meters 150a-150f include other types or combination of types of communication systems for transmitting data either through wired or wireless mechanism (e.g., Wi-Fi, Ethernet, Bluetooth, cellular data, or the like).

Additionally or alternatively, the method 200 may include an operation of the controller 102a for the property 130a receiving utility usage data from a utility meter 150b-150f for one or more properties 130b-130f that are different from the property 130a, e.g., from properties not associated with the controller. For example, the method 200 may include an operation of the controller 102a for the property 130a receiving water usage data from one or more of the utility meters 150b-150f for one or more of the properties 130b-130f. In some embodiments, the utility usage data received from the utility meters may include utility usage for multiple properties and/or multiple other utility meters. For example, the method 200 may include an operation of the controller 102a for the property receiving water usage data from the water meter 150b for property 130b. The property 130b may include multiple water meters from which the water meter 150b receives information, such as a property including multiple units having water meters. The water usage data from the water meter 150b, then, may include water usage data that the water meter 150b received from multiple other water meters.

Additionally or alternatively, the method 200 may include an operation of the controller 102a for the property 130a receiving multiple types of utility usage data for at least one of the properties 130a-130f from the utility meters 150a-150f. For example, the utility meter 150a for the property 130a may include both a water meter and a gas meter. The method 200, then, may include an operation of the controller 102a for the property 130a receiving water usage data from a water meter for the property 130a and also gas usage data from a gas meter for the property 130a. In an example, the controller 102a for the property 130a may receive multiple types of utility usage data for one or more of the other properties 130b-130f.

The method 200 also may include the operation 220, in which the utility usage data received by the controller 102a from one or more of the utility meters 150a-150f is transmitted to the utility company 160. The utility usage data may include at least one of water usage data, gas usage data, or electric usage data from one or more of the properties 130a-130f. For example, water usage data received by the controller 102a from the utility meter 150a may be transmitted to the utility company 160. In an example, water usage data received by the controller 102a from one or more of the utility meters 150b-150f for properties 130b-130f may be transmitted to the utility company. In an example, gas usage data, electric usage data, or other utility usage data received by the controller 102a for the property 130a from one or more of the utility meters 150a-150f for one or more of the properties 130a-130f is transmitted to a gas utility company, an electric utility company, or other utility company, respectively. In some embodiments of the method 200, the utility usage data is transmitted from the controller 102a to the server 106 over the network 110 before the utility usage data is transmitted to the utility company 160. For example, water usage data received by the controller 102a may be transmitted from the controller 102a to the server 106, and the server 106 may perform one or more operations (such as operation 230 of determining an invoice, described below) using the water usage data. Once these one or more operations are performed by the server 106, the server 106 may transmit the utility usage data to the utility company 160.

The method 200 also may include an operation 230, in which the server 106 determines or prepares an invoice for one or more of the properties 130a-130f. The invoice determined and prepared by the server 106 may include identification information, such as one or more of account information, user information, property identification, and so forth. The invoice determined and prepared by the server 106 also may include payment due information. The payment due information may include a utility usage cost based on the utility usage data and the utility rate, service fees, taxes, surcharges for excessive utility consumption, late fees, and so forth. For example, the method 200 may include the server 106 determining or preparing an invoice for the property 130a based on the water usage data received by the controller 102a from a water meter for the property 130a. The invoice for the property 130a may include a payment due amount based on water rates (or utility rates) for the property multiplied by the utility consumption at the property 130a determined from the water usage data, a surcharge for exceeding a water usage limit, and local water taxes. The invoice for the property 130a also may include account information, such as the address of the property 130a, the account number for the property 130a, the dates for which the invoice applies, and the payment due date. Similarly, the method 200 also may include the server 106 determining or preparing an invoice for the property 130a based on the gas usage data and/or the electric usage data received by the controller 102a from a gas meter and/or an electric meter for the property 130a. Additionally or alternatively, the method 200 also may include the server determining or preparing an invoice for one or more of the properties 130b-130f based on one or more of water usage data, gas usage data, and/or electric usage data received by the controller 102a from utility meters 150b-150f for the one or more of the properties 130b-130f.

The method also may include an operation 240, in which the server 106 transmits an invoice for the invoice amount to at least one of the utility company 160 or the user device 108a, 108n associated with property 130a-130d for which the invoice amount is due. For example, in some embodiments of the method 200, the server 106 transmits the invoice amount directly to the utility company 160, and the utility company 160 may then invoice the customer(s) associated with the respective utility meters 150a-150f and utility usage data. The utility company 160 may include a water utility company, a gas utility company, an electric utility company, or other utility companies. In some embodiments of the method 200, the server 106 transmits an invoice for the invoice amount directly to the user devices 108a, 108n associated with the respective properties 130a-130f and/or utility meters 150a-150f for billing. When the server 106 transmits the invoice for the invoice amount directly to the user devices 108a, 108n, the server 106 also may transmit a copy of the invoice for the invoice amount to the utility company 160 for record keeping by the utility company 160. In some embodiments of the method 200, the server 106 receives an invoice for one or more of the properties 130a-130f from the utility company 160, and then transmits the invoice to the one or more user devices 108a, 108n associated with the one or more of the properties 130a-130f. The invoice may be transmitted to the one or more user devices 108a, 108n via a text or email including a hyperlink to pay the invoice on a website of the utility company 160 or the controller 102a company, a push notification on the one or more user devices 108a, 108n indicating that an invoice has been received on an application for the utility company or the controller 102a company installed on the one or more user devices 108a, 108n, or an email including the invoiced attached to the email. For example, the server 106 and the controller 102a may be associated or part of a water control or water irrigation company and the user may download an application on the user device 108a for the water control or water irrigation company. Once the server 106 has prepared a water utility invoice for the property 130a, the server 106 may push a notification on the user device 108a indicating that a water usage invoice for the user account is prepared and/or available for viewing on the application.

Additionally or alternatively, the method 200 may include operations of receiving an encryption key from the utility company 160 and decoding the utility usage data received from one or more utility meters 150a-150f using the encryption key. For example, the method 200 may include operations of receiving an encryption key from a water utility company and decoding water usage data received from the utility meter 150a using the encryption key. In some embodiments, of the method 200, the controller 102a uses the encryption key to decode the utility usage data received by the controller 102a from one or more of the utility meters 150a-150f. In some embodiments, the controller 102a transmits encrypted utility usage data received from one or more of the utility meters 150a-150f to the server 106, and the server 106 uses the encryption key to decode the utility usage data. In some embodiments, the method 200 may use asymmetric encryption as described herein.

Additionally or alternatively, the method 200 may include an operation of detecting or determining indoor water usage and outdoor water usage for one or more of the properties 130a-130f. For example, the method 200 may include the controller 102a or the server 106 estimating outdoor water usage for the property 130a based on irrigation duration for the property 130a during a month. Indoor water usage for the property 130a for the month, then, may be determined by subtracting the estimated outdoor water usage from the total water usage for the month. In another example, the method 200 may include the controller 102a distinguishing indoor water usage from outdoor water usage based on the water line providing the water to the properties 130a, e.g. the controllers 102a may detect indoor water usage based on a water line providing indoor water and may detect outdoor water usage based on a water line providing outdoor water. In another example, the method may include the controllers 102a, distinguishing indoor water usage from outdoor water usage based on the water lines or valves on the properties directing the water to indoor or outdoor water lines, e.g., the controllers 102a may detect indoor water usage based on a valve or water line on the property 130a directing water to one or more indoor lines and may detect outdoor water usage based on a valve or water line on the property 130a directing water to one or more outdoor lines.

Figure 4:
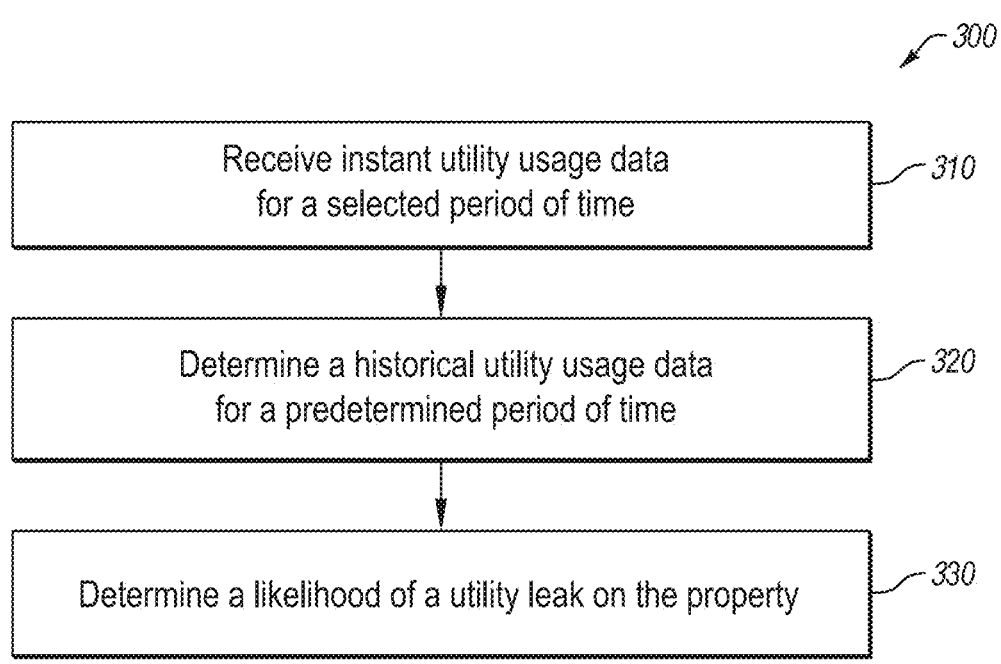
FIG. 4 is a flow chart illustrating a method of the system of FIG. 1 to detect a utility leak on a property.

FIG. 4 is a flow chart illustrating a method 300 of the system 100 to detect a utility leak on one or more of the properties 130a-130f using the controller 102a and one or more of the utility meters 150a-150f. The method 300 may include operations 310, 320, and 330 described in greater detail below. Operations 310, 320, and 330 are for illustrative purposes. For example, operations 310, 320, and 330 may be performed in different orders, split into multiple operations, modified, supplemented, or combined. In an embodiment, one or more of the operations 310, 320, and 330 of the method 300 may be omitted from the method 300. One or more of the operations 310, 320, and 330 in the method 300 also may be included and incorporated into the method 200 of collecting utility meter data from one or more of the properties 130a-130f using the controller 102a and one or more utility meters 150a-150f. In many embodiments, one or more of the controller 102a, the server 106, or a combination of the controller 102 and the server 106 may perform one or more (e.g., all) of the operations 310, 320, and 330.

With reference to FIG. 4, the method 300 may begin with operation 310 and the controller 102a and/or the server 106 receives instant utility usage data from the one or more of the utility meters 150a-150f for a selected period of time. For example, the method 300 may include the controller 102a communicating with utility meters 150a-150f at any of a number of different predetermined time periods or intervals to receive utility usage data for the respective utility meters 150a-150f. The controller 102a may then transmit the utility usage data for a selected time period to the server 106, or the server 106 may determine the utility usage data for a selected time period using the utility usage data for one or more of the different predetermined time periods or intervals as received from the controller 102a. The instant utility usage data for the selected time period may include one or more of the predetermined time periods or intervals described, such as the utility usage data for the past 5 minutes, the past 10 minutes, the past 30 minutes, the past hour, the past 12 hours, the past day, the past month, and so on. For example, the controller 102a may transmit to the server 106 the water usage data for a day at the property 130a, or the server 106 may determine the water usage data for a day at the property 130a using the water usage data transmitted to the server 106.

The method 300 may include operation 320, in which the server 106 determines a historical utility usage data based on the utility usage data for one or more of the properties for a predetermined period of time that is greater than the selected period of time. For example, the method 300 may include the server 106 determining a historical utility usage data by averaging the daily utility usage for the past month or year at the one or more respective properties 130a-130f. The server 106 also may determine a historical utility usage data by averaging the daily utility usage for a particular month or season based on multiple years of utility usage. The server 106 also may determine a historical utility usage data by averaging utility usage in a predetermined geographic area, such as properties 130a-130f. The historical utility usage data also may be determined using average utility usage at properties within a predetermined area having comparable features, such as a similar lot acreage, a similar house square footage, a similar number of occupants, a similar property use (residential or commercial), or combinations thereof. The historical utility usage data may be based on utility usage data collected and stored by the controller 102a, utility usage data collected and/or stored by the utility company 160, or combinations thereof. In some embodiments, the server 106 also may determine a historical utility usage data by communicating with the infrastructure databases 112 described above.

The method 300 also may include operation 330, in which the server 106 determines a likelihood of a utility leak on one or more of the properties 130a-130f by comparing the instant utility usage data for the one or more of the properties 130a-130f to the historical utility usage data. For example, the method 300 may include the server 106 determining a likelihood of a water leak at the property 130a by comparing the instant water usage data for the past day at the property 130a to historical usage data at the property 130a and/or the properties 130b-130f. The likelihood of the utility leak may, for example, be determined based on a threshold number of standard deviations from any of the averages described above. In an example, the property 130a may average 1 CCF of water consumption on a summer day or over the past month, with a standard deviation of 0.5 CCF. The server 106 or the controller 102a may receive the water usage data from the water meter 150a and determine that 5 CCF of water was consumed on property 130a over the past 24 hours. Because the water consumption for the past 24 hours far exceeds the standard deviation of water usage for the property 130a, the server 106 or the controller 106 determine a leak or some other uncommon water usage event has occurred at the property 130a.

In some embodiments, if the server 106 determines that a utility leak is likely to have occurred at one or more of the properties 130a-130f, the method 300 may include an operation of the server 106 transmitting a message or alert to at least one of the utility company 160 and/or the user device 108a, 108n associated with the one or more of the properties 130a-130f determined to have a utility leak. The message or alert may indicate the likelihood of the utility leak at the one or more of the properties 130a-130f, and also may include additional instructions for the customer.

Figure 5:
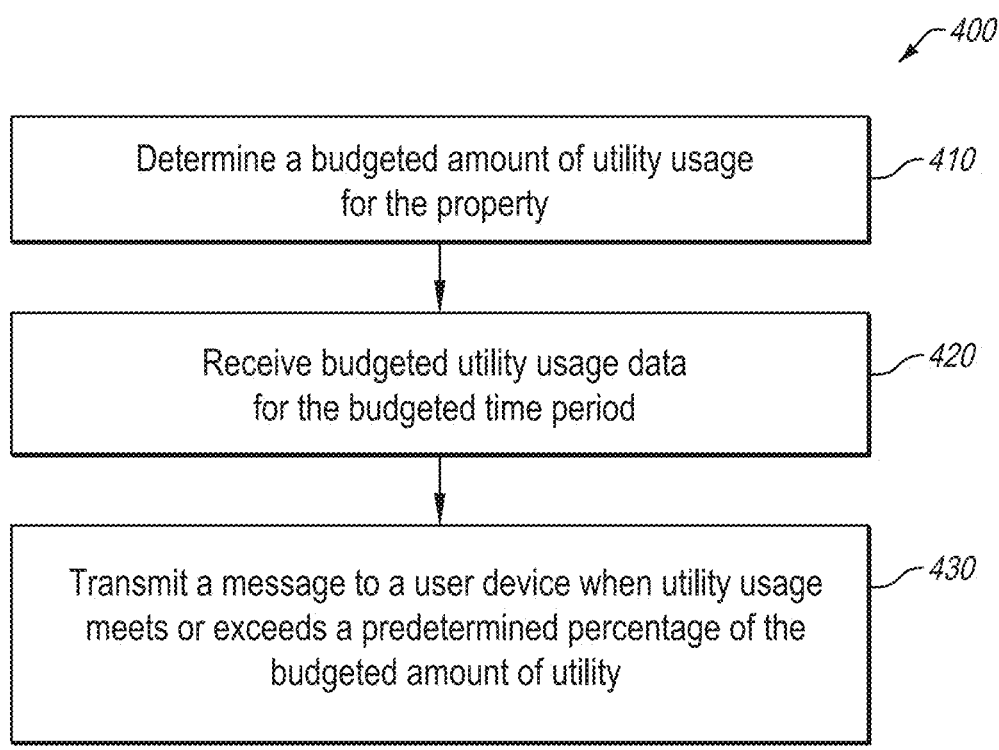
FIG. 5 is a flow chart illustrating a method of the system of FIG. 1 to facilitate a customer budgeting one or more utilities on a property.

FIG. 5 is a flow chart illustrating a method 400 of the system 100 to facilitate one or more customers budgeting one or more utilities for corresponding one or more of the properties 130a-130f. The method 400 may include operations 410, 420, and 430 described in greater detail below. Operations 410, 420, and 430 are for illustrative purposes. For example, operations 410, 420, and 430 may be performed in different orders, split into multiple operations, modified, supplemented, or combined. In an embodiment, one or more of the operations 410, 420, and 430 of the method 400 may be omitted from the method 400. One or more of the operations 410, 420, 430 in the method 400 also may be included and incorporated into at least one of the method 200 or the method 300. In many embodiments, one or more of the controller 102a, the server 106, or a combination of the controller 102 and the server 106 may perform one or more (e.g., all) of the operations 410, 420, and 430.

With reference to FIG. 4, the method 400 may begin with operation 410, in which the server 106 determines a budgeted amount of a utility usage during a budgeted time period for the properties 130a-130f. The budgeted amount of the utility usage may be determined by the server 106 based on utility caps received from the infrastructure database 112 or the utility company 160. For example, the method 400 may include the server 106 determining the budgeted amount of water usage based on water caps or maximums mandated or encouraged by local government in the infrastructure database 112 or the water utility company. In an example, a local jurisdiction of a water utility company may limit water consumption on the properties 130a-130f to 10 CCF per month before water usage rates double for water consumption beyond 10 CCF. The controller 102a or the server 106, then, may communicate with the infrastructure database 112 or the utility company 160 to determine that the property 130a is budgeted 10 CCF of water per month before water usage rates double for CCFs of water consumed beyond 10 CCFs. Additionally or alternatively, the budgeted amount of utility usage may be determined by the server 106 based on a monetary budget entered by the customer associated with one of the properties 130a-130f. For example, a user living on the property 130a may not wish to pay more than $100 per month for water utilities. The user living on the property 130a, then, may enter a budgeted amount of $100. The budgeted amount of the utility usage may be determined by the server 106 based on an average amount of the utility used on the properties 130a-130f. For example, the controller 102a may collect water usage data from the properties 130a-130f, and the server 106 may determine a budgeted amount of water usage of 10 CCF per month based on an average amount of the water used by the properties 130a-130f.

As noted above, the controllers 102a may distinguish indoor water usage from outdoor water usage for each property 130a-130f or may detect either indoor/outdoor or a specific type of use (e.g., sprinkler/irrigation use). Accordingly, the method 400 also may include the server 106 determining a budgeted amount of indoor water usage and a budgeted amount of outdoor water usage during a budgeted time period for the properties 130a-130f.

The method 400 also may include an operation 420, in which the server 106 receives budgeted utility usage data for the budgeted time period from the controller 102a for one or more of the properties 130a-130f, the budgeted utility usage data having been received by the controller 102a from one or more of the utility meters 150a-150f. In many embodiments, the budgeted utility usage data is included in the utility usage data received by the controller 102a from one or more of the utility meters 150a-150f and transmitted from the controller 102a to the server 106. Once received by the server 106, the method 400 may include an operation of the server 106 identifying the budgeted utility usage data for the one or more properties 130a-130f from the utility usage data from the one or more utility meters 150a-150f.

In many embodiments of the method 400, the method includes an operation of detecting or determining indoor water usage and outdoor water usage for one or more of the properties 130a-130f, as described above in the relation to the method 200. Because the controllers 102a may be configured to distinguish indoor water usage from outdoor water usage for each property 130a-130f, the method 400 also may include an operation of the server 106 receiving budgeted indoor water usage data and budgeted outdoor water usage data for the budgeted time period from the controller 102a for one or more of the properties 130a-130f, the budgeted indoor water usage data and the budgeted outdoor water usage data having been received by the controller 102a from one or more of the utility meters 150a-150f. In many embodiments, the budgeted indoor water usage data and the budgeted outdoor water usage data are included in the water usage data received by the controller 102a from one or more of the utility meters 150a-150f and transmitted from the controller 102a to the server 106. Once received by the server 106, the server 106 may identify the budgeted indoor water usage data and the budgeted outdoor water usage data for the one or more properties 130a-130f from the water usage data from the one or more utility meters 150a-150f.

The method 400 also may include an operation 430, in which the server 106 transmits a message to a user device 108a, 108n associated with a property of the properties 130a-130f when the budgeted utility usage data indicates that utility usage at the property during the budgeted time period meets or exceeds a predetermined percent of the budgeted amount of utility usage during the budgeted time period. For example, if the server 106 determines that the water usage data for the property 130a indicates that water usage at the property 130a during a billing cycle exceeds a predetermined threshold, an embodiment of the method 400 may include the server 106 transmitting a message to the user device 108a associated with the customer on the property 130a, the message indicating that the predetermined threshold of water usage for the billing cycle has been met or exceeded. The message may include one or more of a push notification on the user device(s) 108a, 108n, a text message transmitted to the user device(s) 108a, 108n, an email sent to an email address associated with the account, a phone call to a phone number associated with the account, or combinations thereof. Returning to the example above including a local jurisdiction that limits water consumption on the properties 130a-130f to 10 CCF per month before water usage rates double, the water usage data received by the controller 102a from the water meter 150a may indicate that the property 130a has consumed 9 CCF of water in the month. The server 106, then, may transmit a message the user device indicating that 90% of the budgeted water for the month has been consumed on the property 130a. Similar messages may be transmitted when the water usage data for the property 130a indicates that 50%, 75%, or 100% of the budgeted amount of water usage has been consumed on the property 130a. Returning to the example above including a user setting a budgeted amount of $100 for water for the month, the water usage data received by the controller 102a from the water meter 150a may indicate that the property 130a has consumed water that will cost $75 based on the current water rate. The server 106, then, may transmit a message the user device indicating that 75% of the budgeted water for the month has been consumed on the property 130a.

Because the controllers 102a may be configured to distinguish indoor water usage from outdoor water usage for each property 130a-130f, the method 400 also may include an operation of the server 106 transmitting a message to a user device 108a, 108n associated with a corresponding property of the properties 130a-130f when the budgeted indoor water usage data or the budgeted outdoor water usage data indicates that indoor water usage or outdoor water usage at the property during the budgeted time period meets or exceeds a predetermined percent of the budgeted amount of indoor water usage or outdoor water usage during the budgeted time period.

Figure 6:
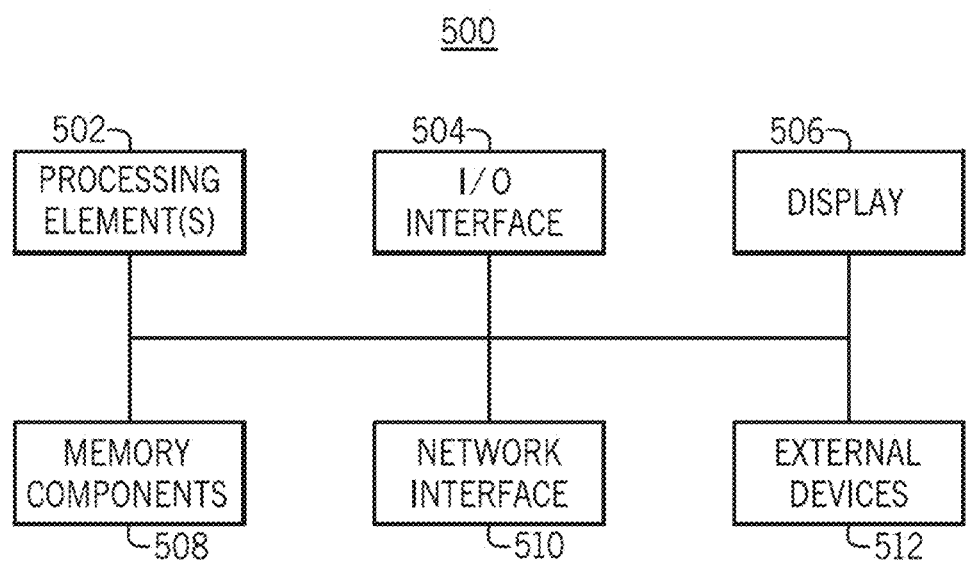
FIG. 6 is a simplified block diagram of a computing device that can be used by one or more components of the system of FIG. 1.

A simplified block structure for a computing device that may be used with the system 100 or integrated into one or more of the system 100 is shown in FIG. 6. For example, the server 106, user devices 108a-108n, controllers 102a-102n, and/or infrastructure databases 112 may include one or more of the components shown in FIG. 6 and be used to execute one or more of the operations disclosed in methods 200, 300, and/or 400. With reference to FIG. 6, the computing device 500 may include one or more processing elements 502, an input/output interface 504, a display 506, one or more memory components 508, a network interface 510, and one or more external devices 512. The various components may be in communication with one another through one or more busses, wireless means, or the like.

The processing element 502 is any type of electronic device capable of processing, receiving, and/or transmitting instructions. For example, the processing element 502 may be a central processing unit, microprocessor, processor, or microcontroller. Additionally, it should be noted that select components of the computer 500 may be controlled by a first processor and other components may be controlled by a second processor, where the first and second processors may or may not be in communication with each other.

The memory components 508 are used by the computer 500 to store instructions for the processing element 502, as well as store data, such as the fluid device data, historical data, and the like. The memory components 508 may be, for example, magneto-optical storage, read-only memory, random access memory, erasable programmable memory, flash memory, or a combination of one or more types of memory components.

The display 506 provides visual feedback to a user and, optionally, can act as an input element to enable a user to control, manipulate, and calibrate various components of the computing device 500. The display 506 may be a liquid crystal display, plasma display, organic light-emitting diode display, and/or cathode ray tube display. In embodiments where the display 506 is used as an input, the display may include one or more touch or input sensors, such as capacitive touch sensors, resistive grid, or the like.

The I/O interface 504 allows a user to enter data into the computer 500, as well as provides an input/output for the computer 500 to communicate with other devices (e.g., controllers 102a, 102n other computers, speakers, etc.). The I/O interface 504 can include one or more input buttons, touch pads, and so on.

The network interface 510 provides communication to and from the computer 500 to other devices. For example, the network interface 510 allows the server 106 to communicate with the controllers 102a, 102n through the network 110. The network interface 510 includes one or more communication protocols, such as, but not limited to Wi-Fi, Ethernet, Bluetooth, and so on. The network interface 510 may also include one or more hardwired components, such as a Universal Serial Bus (USB) cable, or the like. The configuration of the network interface 510 depends on the types of communication desired and may be modified to communicate via Wi-Fi, Bluetooth, and so on.

The external devices 512 are one or more devices that can be used to provide various inputs to the computing device 500, e.g., mouse, microphone, keyboard, trackpad, or the like. The external devices 512 may be local or remote and may vary as desired.

CONCLUSION

The foregoing description has broad application. For example, while examples disclosed herein may focus on residential water systems, it should be appreciated that the concepts disclosed herein may equally apply to other water systems, such as commercial properties. Similarly, although the system is discussed with respect to water sources, the system and methods may be used with substantially any other type of fluid or utility systems. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary

What is claimed is:

1. A method of collecting utility meter data for a residential home comprising:
   measuring by a water meter for the residential home, water usage for the residential home, wherein the water meter is controlled by a water utility that provides water to the residential home on behalf of a water utility customer;
   receiving from a water utility customer device a water utility customer selected budget for water usage for the residential home;
   detecting, via a sensor, a signal from the water meter indicative of the water usage;
   generating water usage data based on the signal, wherein the water usage data comprises determining water usage relative to the water utility customer selected budget for water usage for the residential home;
   transmitting the water usage data from the sensor to a first device associated with the residential home;
   transmitting the water usage data from the first device to the water utility customer device;
   displaying the water usage relative to a plurality of budget percentage thresholds for the water utility customer selected budget for water usage on a display of the water utility customer device;
   detecting a water leak associated with the residential home based on a comparison of the water usage for the residential home relative to water usage for a plurality of other residential homes; and
   transmitting the water usage data to the water utility, wherein the water usage data indicates that the water usage is for the residential home.

2. The method of claim 1, further comprising transmitting the water usage data from the sensor to the first device.

3. The method of claim 2, further comprising:
measuring by a second water meter for a second residential home, second water usage for the second residential home, wherein the second water meter is controlled by the water utility that provides water to the second residential home;
detecting, via a second sensor, a second signal from the second water meter indicative of the second water usage;
generating second water usage data based on the second signal; and
transmitting the second water usage data to the water utility, wherein the second water usage data of the second water usage data indicates that the second water usage is for the second residential home.

4. The method of claim 3, further comprising transmitting the second water usage data from the second sensor to a second device associated with the second residential home.

5. The method of claim 2, wherein the first device tracks the water usage data over time.

6. The method of claim 1, wherein the first device controls a flow control device.

7. The method of claim 1, further comprising:
receiving by the first device second water usage data from the water meter for a selected period of time;
determining a first historical water usage data based on the water usage data for a predetermined period of time that is greater than the selected period of time; and
determining a likelihood of the water leak at the residential home by comparing the second water usage data to the first historical water usage data.

8. The method of claim 1, further comprising transmitting an alert message indicative of the water leak to an application executing on the water utility customer device of a user associated with the residential home.

9. The method of claim 2, wherein the water meter is within a predetermined range of the first device, to enable wireless communication between the sensor and the first device.

10. The method of claim 2, wherein the water usage data is transmitted from the sensor to the first device wirelessly.

11. The method of claim 10, wherein the water utility customer device and the first device are both in wireless communication with a network and the water usage data is wirelessly transmitted from the first device to the water utility customer device via the network.

12. The method of claim 1, further comprising:
analyzing the water usage to distinguish an amount of the water usage that is outdoor water usage; and
analyzing the water usage to distinguish an amount of the water usage that is indoor water usage.

13. The method of claim 12, wherein the outdoor water usage is distinguished based on a known irrigation characteristic of the residential home.

14. The method of claim 1, further comprising generating a user message including the water usage data presented as gallons per day.

15. A system of collecting utility meter data for a residential home comprising:
a water meter for the residential home configured to measure water usage for the residential home, wherein the water meter is controlled by a water utility that provides water to the residential home;
a first device associated with the residential home;
a water utility customer device in communication with the first device; and
a processing element in communication with the first device configured to:
receive from the water utility customer device a water utility customer selected budget for water usage for the residential home;
detect via a sensor a signal from the water meter indicative of the water usage;
generate water usage data based on the signal;
transmit the water usage data to the first device;
detect a water leak associated with the residential home based on a comparison of water usage for the residential home relative to water usage for a plurality of other residential homes;
transmit the water usage data to the water utility; and
determine water usage relative to the water utility customer selected budget for water usage, wherein:
the water usage data indicates that the water usage is for the residential home;
the first device is configured to transmit the water usage data relative to a plurality of budget percentage thresholds for the water utility customer selected budget for water usage to the water utility customer device; and
the water utility customer device is configured to display the water usage data on a display thereof.

16. The system of claim 15, wherein the processing element is configured to transmit the water usage data from the sensor to the first device.

17. The system of claim 16, wherein the water meter is within a predetermined range of the first device, to enable wireless communication between the sensor and the first device.

18. The system of claim 15, wherein the processing element is configured to transmit an alert message indicative of the water leak to an application executing on the water utility customer device of a user associated with the residential home.

19. A method of collecting utility meter data for a residential home comprising:
measuring by a water meter for the residential home, water usage for the residential home, wherein the water meter is controlled by a water utility that provides water to the residential home on behalf of a water utility customer;
detecting, via a sensor, a signal from the water meter indicative of the water usage;
generating water usage data based on the signal;
transmitting the water usage data from the sensor to a first device associated with the residential home;
transmitting the water usage data from the first device to a water utility customer device;
detecting a water leak associated with the residential home based on a comparison of the water usage for the residential home relative to water usage for a plurality of other residential homes; and
transmitting an alert message indicative of the water leak to an application executing on the water utility customer device of a user associated with the residential home.

* * * * *